G. W. DUNN.
BURIAL CASE.
APPLICATION FILED MAR 19, 1920.
1,431,727.
Patented Oct. 10, 1922.
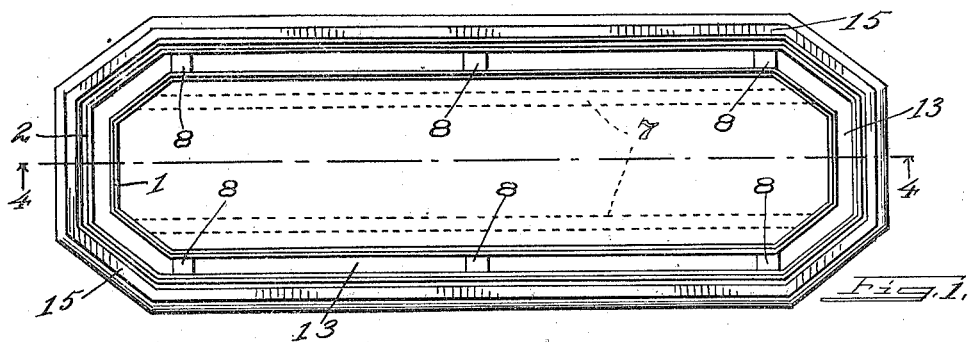
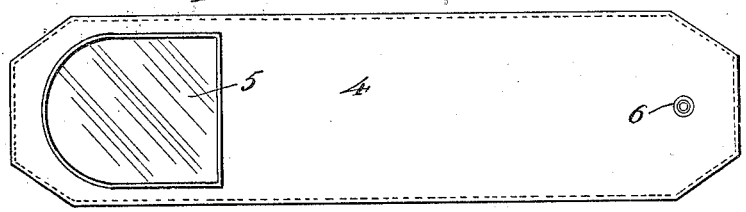
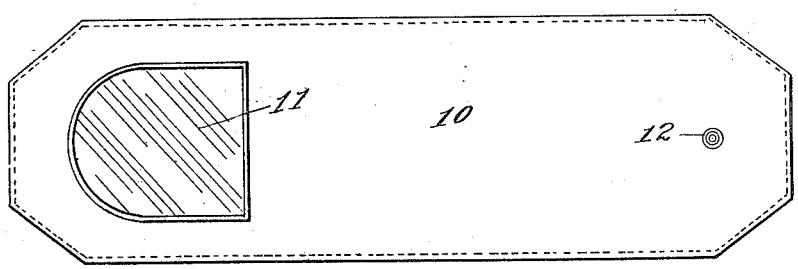
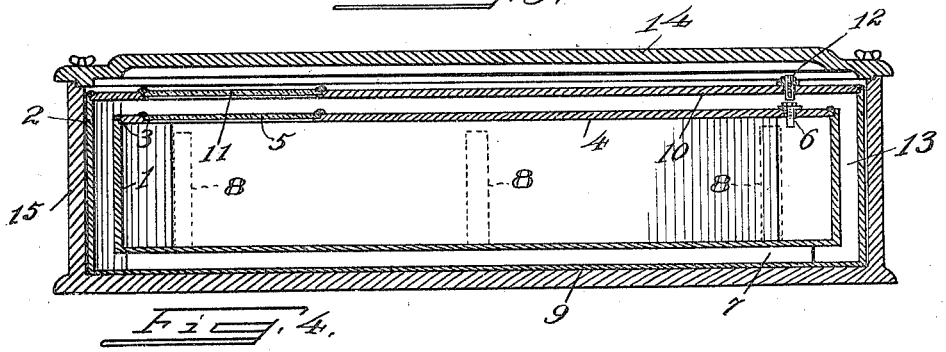
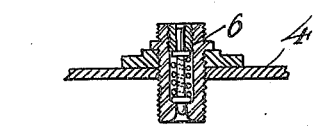
INVENTOR:
George W. Dunn
BY James N. Ramsey
ATTORNEY.

Patented Oct. 10, 1922.

1,431,727

UNITED STATES PATENT OFFICE.

GEORGE W. DUNN, OF NEWPORT, KENTUCKY.

BURIAL CASE.

Application filed March 19, 1920. Serial No. 367,054.

*To all whom it may concern:*

Be it known that I, GEORGE W. DUNN, a citizen of the United States, residing at Newport, in the county of Campbell and State of Kentucky, have invented certain new and useful Improvements in Burial Cases, of which the following is a specification.

The object of my invention is to preserve a corpse indefinitely from discoloring or decay after it has been so embalmed as to destroy the germs therein, and to afford convenient means for viewing said corpse.

My invention consists in hermetically sealing an embalmed corpse in a burial case, creating a partial vacuum therein and then sealing said case within an outer case, producing a partial vacuum in said outer case and in providing a glass in the top of each case through which the corpse may be viewed.

My invention also consists in the details of construction and in the parts and combination and arrangement of parts as set forth and claimed.

In the drawings:

Fig. 1 is a top view of the inner receptacle, outer receptacle and casing therefor, with the lids removed;

Fig. 2 is a top view of the lid for the inner receptacle;

Fig. 3 is a top view of the lid for the outer receptacle;

Fig. 4 is a vertical longitudinal section through the center of the inner and outer receptacles and the casing for the outer receptacle, including the lids; and Fig. 5 is an enlarged detail sectional view of each valve.

In the embodiment of my invention as illustrated, and which shows a preferred construction, the corpse, after being embalmed to destroy the germs, is placed within metallic receptacle 1, having a flange 2 around its upper edge, within which a ledge 3 is formed and on which ledge a metallic lid 4 is mounted. The lid is hermetically sealed with solder *s* or other suitable material to close the joint between the lid 4 and receptacle 1. Lid 4 is provided with a glass 5 which is sealed therein. It is also provided with valve 6 to which an air pump may be readily attached for exhausting the air from the receptacle and creating a partial vacuum therein. Receptacle 1 is provided with suitable supports 7 on its bottom and spacing members 8 upon its sides by which it is suitably spaced apart from outer receptacle 9 within which it is placed, thereby forming a space between said receptacles and entirely around the inner receptacle. The outer receptacle is provided with a metallic lid 10 sealed to said receptacle 9 in a manner similar to the sealing of the lid 4 to inner receptacle 1. Lid 10 is provided with a glass 11 placed directly over glass 5 in lid 4 and lid 10 is also provided with valve 12. After lid 10 has been sealed in position, the air is withdrawn through valve 12 to create a vacuum in the space 13 surrounding receptacle 1. The lid 14 is then removably secured on case 15 to permit convenient access for the purpose of viewing the corpse when desired.

It will be apparent that my invention is capable of some modification without departure from the scope or spirit thereof, as for instance, instead of forming the receptacle 9 as a lining for the case 15 of wood or other material, the outer receptacle may be formed entirely of metal if desired.

Having described my invention and its manner of use, what I claim as new and desire to secure by Letters Patent is:

1. A portable burial case having an outer metallic receptacle, an inner metallic receptacle, for an embalmed corpse, mounted within said outer receptacle and spaced apart therefrom entirely therearound, an inner metallic lid hermetically sealing said inner receptacle, a valve through which the air may be withdrawn from said inner receptacle to produce a vacuum therein, an inner glass sealed in said inner metallic lid, an outer metallic lid having an outer glass sealed therein, means hermetically sealing said outer receptacle and a valve therein for withdrawing the air from the space between said receptacles, substantially as set forth and for the purposes specified.

2. A portable burial case comprising an inner receptacle having an embalmed corpse hermetically sealed therein, means for producing a partial vacuum in said inner receptacle, an outer receptacle containing said inner receptacle and spaced apart therefrom entirely therearound, means for hermetically sealing said inner receptacle in said outer receptacle, means for withdrawing the air from the space between said receptacles and creating a vacuum therein, and a glass in the lid of each receptacle coincident with each other whereby the corpse may be viewed without destroying the vacuum in either receptacle, substantially as set forth and for the purposes specified.

3. The process of preserving an embalmed corpse indefinitely which consists in placing it in an inner portable receptacle having a lid adapted to be hermetically sealed, sealing said lid, withdrawing the air from said inner receptacle to form a vacuum therein, placing said inner receptacle in an outer portable receptacle having a space entirely therearound between said receptacles, placing a lid on said outer receptacle, sealing said outer receptacle and then withdrawing the air from the space between said receptacles, substantially as set forth and for the purposes specified.

GEORGE W. DUNN.